US012703388B2

(12) United States Patent
Qu et al.

(10) Patent No.: US 12,703,388 B2
(45) Date of Patent: Aug. 11, 2026

(54) OFFLINE AND ONLINE COMPENSATION FOR CONTROL IN AUTONOMOUS DRIVING

(71) Applicant: TuSimple, Inc., San Diego, CA (US)

(72) Inventors: Shen Qu, San Diego, CA (US); Jingxuan Liu, San Diego, CA (US); Patrik Kolaric, San Diego, CA (US); Mohamadreza Ahmadi, Pasadena, CA (US); Junbo Jing, San Diego, CA (US)

(73) Assignee: CreateAI, Inc., San Diego, CA (US)

( * ) Notice: Subject to any disclaimer, the term of this patent is extended or adjusted under 35 U.S.C. 154(b) by 167 days.

(21) Appl. No.: 18/818,729

(22) Filed: Aug. 29, 2024

(65) Prior Publication Data

US 2025/0083699 A1 Mar. 13, 2025

Related U.S. Application Data

(60) Provisional application No. 63/581,190, filed on Sep. 7, 2023.

(51) Int. Cl.
*B60W 60/00* (2020.01)
*G01C 21/30* (2006.01)
(Continued)

(52) U.S. Cl.
CPC ........... *B60W 60/001* (2020.02); *G01C 21/30* (2013.01); *G01C 21/34* (2013.01); *G05D 1/43* (2024.01)

(58) Field of Classification Search
CPC ....... B60W 60/001; B60W 2050/0008; B60W 2520/105; B60W 60/0015;
(Continued)

(56) References Cited

U.S. PATENT DOCUMENTS

2018/0088582 A1* 3/2018 Kong ................ B60W 50/0097
2018/0178801 A1* 6/2018 Hashimoto .......... B62D 15/025
(Continued)

FOREIGN PATENT DOCUMENTS

CN 121553121 A * 2/2026
KR 20260025227 A * 2/2026 ........... G06V 10/803

*Primary Examiner* — Peter D Nolan
*Assistant Examiner* — Peter Y Ning
(74) *Attorney, Agent, or Firm* — Ashurst Perkins Coie US LLP

(57) ABSTRACT

Devices, systems, and methods for controlling a vehicle are described. An example method for controlling a vehicle includes obtaining planning information relating to an intended operation of the vehicle, the intended operation relating to an intended value of an operation parameter of the vehicle; obtaining, based on the intended operation of the vehicle, context information relating to an environment in which the vehicle is to operate following the planning information; determining a context compensated control instruction based on the planning information and the context information; obtaining feedback relating to a deviation of a real-time value of the operation parameter of the vehicle operating according to the context compensated control instruction from the intended value of the operation parameter relating to the intended operation; determining a corrected control instruction based on the feedback; and operating the vehicle based on the corrected control instruction.

20 Claims, 10 Drawing Sheets

(51) Int. Cl.
*G01C 21/34* (2006.01)
*G05D 1/43* (2024.01)

(58) Field of Classification Search
CPC ......... B60W 2520/10; B60W 2530/10; B60W 2552/00; B60W 2556/50; G01C 21/30; G01C 21/34; G05D 1/43
See application file for complete search history.

(56) References Cited

U.S. PATENT DOCUMENTS

| | | | | |
|---|---|---|---|---|
| 2018/0348763 | A1* | 12/2018 | Jiang | B60W 60/001 |
| 2020/0317216 | A1* | 10/2020 | Konrardy | B60W 30/182 |
| 2022/0026921 | A1* | 1/2022 | Halder | B60W 60/00 |
| 2023/0010007 | A1* | 1/2023 | Wang | B60W 60/0053 |
| 2023/0288886 | A1* | 9/2023 | Berntorp | G05B 13/048 |
| 2023/0365153 | A1* | 11/2023 | Narang | G08G 1/0133 |
| 2024/0116492 | A1* | 4/2024 | Filipenko | B60W 60/0025 |

* cited by examiner

OFFLINE AND ONLINE COMPENSATION FOR CONTROL IN AUTONOMOUS DRIVING

CROSS-REFERENCE TO RELATED APPLICATIONS

This document claims priority to and the benefit of U.S. Provisional Application No. 63/581,190, filed on Sep. 7, 2023. The aforementioned application of which is incorporated herein by reference in its entirety.

TECHNICAL FIELD

This document generally relates to autonomous driving, and more specifically, offline and/or online compensation for control in autonomous driving.

BACKGROUND

Autonomous vehicle navigation is a technology for sensing the position and movement of a vehicle and, based on the sensing, autonomously control the vehicle to navigate towards a destination. Autonomous vehicle control and navigation can have important applications in transportation of people, goods and services. Efficiently generating commands for the powertrain of a vehicle that enable its accurate control is paramount for the safety of the vehicle and its passengers, as well as people and property in the vicinity of the vehicle, and for the operating efficiency of driving missions.

SUMMARY

One aspect of the present document relates to devices, systems, and methods for offline-online collaborative compensation for model predictive control in autonomous driving. Another aspect of the present document relates to devices, systems, and methods for offline or online compensation for model predictive control in autonomous driving.

An example method for controlling a vehicle includes obtaining planning information relating to an intended operation of the vehicle, the intended operation relating to an intended value of an operation parameter of the vehicle; obtaining, based on the intended operation of the vehicle, context information relating to an environment in which the vehicle operates following the planning information; determining a context compensated control instruction based on the planning information and the context information; obtaining feedback relating to a deviation of a real-time value of the operation parameter of the vehicle operating according to the context compensated control instruction from an intended value of the operation parameter relating to the intended operation; determining a corrected control instruction based on the feedback; and operating the vehicle based on the corrected control instruction.

Another aspect of the present document relates to devices, systems, and methods for generating a context compensation model based on a multivariate probability prediction algorithm.

Another aspect relates to an apparatus for controlling an autonomous vehicle. The apparatus includes one or more processors configured to implement any one of the methods described herein. The apparatus may be installed or carried onboard the vehicle.

Another aspect relates to one or more non-transitory computer-readable media that have instructions stored thereon; the instructions, upon execution by one or more processors, may cause the one or more processors to implement any one of the methods described herein.

The above and other aspects and features of the disclosed technology are described in greater detail in the drawings, the description, and the claims.

DETAILED DESCRIPTION

Figure 1:
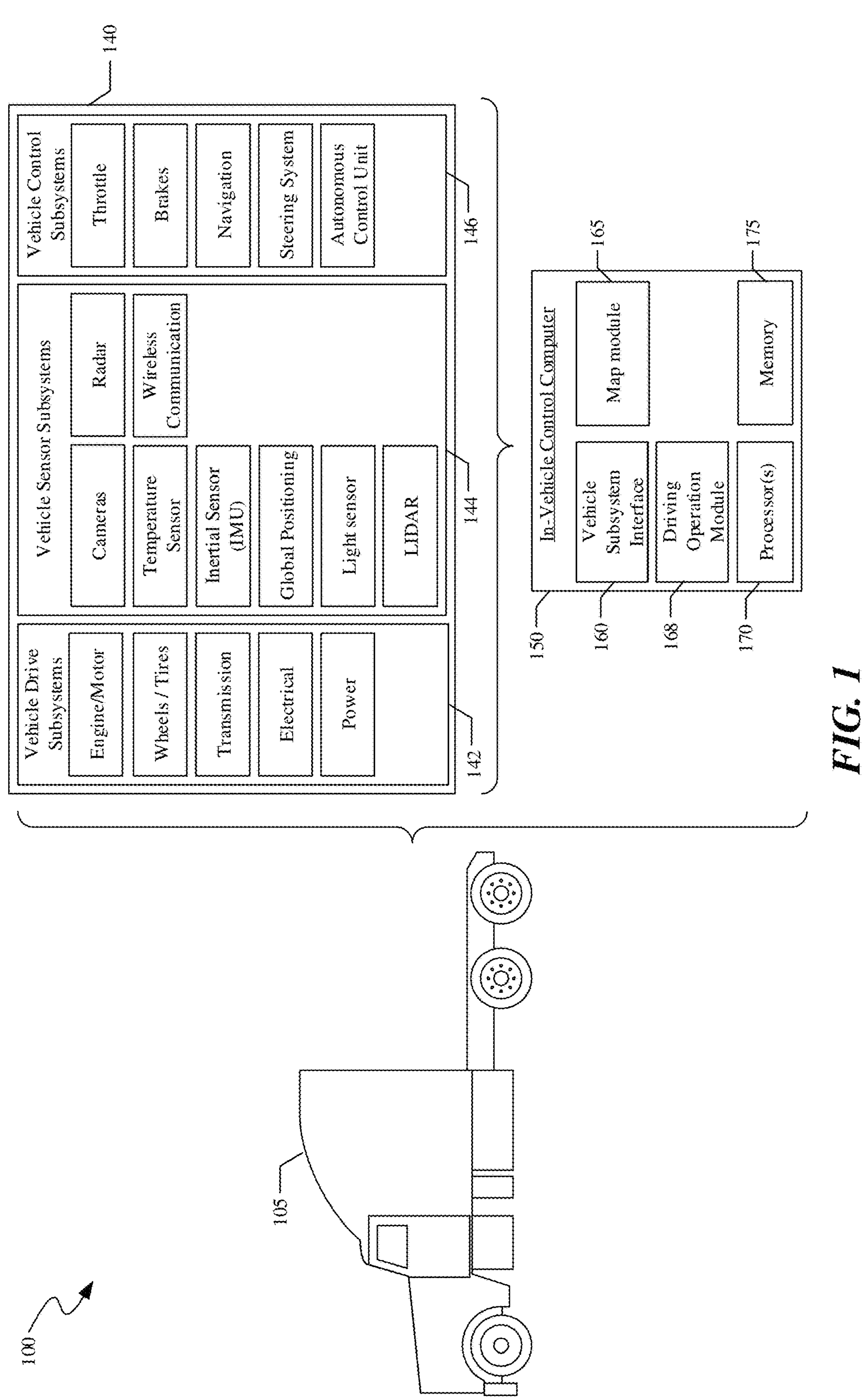
FIG. 1 illustrates a block diagram of an example vehicle ecosystem according to some embodiments of the present document.

The transportation industry has been undergoing considerable changes in the way technology is used to control the operation of vehicles. As exemplified in the automotive passenger vehicle, there has been a general advancement towards shifting more of the operational and navigational decision making away from the human driver and into on-board computing power. This is exemplified in the extreme by the numerous under-development autonomous vehicles. Current implementations are in intermediate stages, such as the partially-autonomous operation in some vehicles (e.g., autonomous acceleration and navigation, but with the requirement of a present and attentive driver), the safety-protecting operation of some vehicles (e.g., maintaining a safe following distance and automatic braking), the safety-protecting warnings of some vehicles (e.g., blind-spot indicators in side-view mirrors and proximity sensors), as well as case-of-use operations (e.g., autonomous parallel parking).

Different types of autonomous vehicles have been classified into different levels of automation under the Society of Automotive Engineers' (SAE) J3016 standard, which ranges from Level 0 in which the vehicle has no automation to Level 5 (L5) in which the vehicle has full autonomy. In an example, SAE Level 4 (L4) is characterized by the vehicle operating without human input or oversight but only under select conditions defined by factors such as road type or geographic area. In order to achieve SAE L4 autonomy, vehicle control commands must be efficiently computed while collaborating with both the high-level mission planner and the low-level powertrain characteristics and capabilities.

The control of autonomous vehicles is a challenging task, particularly in the face of uncertainty and nonlinearity. A model predictive controller (MPC) may be employed to implement autonomous (or semi-autonomous) driving of a vehicle (e.g., a car, a truck). MPC may face several technical challenges or problems. A first technical challenge or problem is model uncertainty. The accuracy of a system model used for depicting the vehicle operating in an environment can impact the performance of the controller. For example, a real system behavior of the vehicle may deviate from a calibrated system model due to changes in conditions like aging, wear, external wind, etc. These factors may cause uncertainty about the system model, which is hard to be mathematically modeled in dynamics functions. Merely by way of example with respect to an autonomous truck, this challenge may be manifested as insufficient acceleration when the vehicle passes through a local turn. The insufficient acceleration may be primarily due to the increased resistance that may occur with an increased tractor-trailer angle. However, the highly nonlinear nature of this resistance may make it difficult to model accurately in the MPC prediction model system.

A second technical challenge or problem lies in handling nonlinearity in the system including the vehicle and the environment in which the vehicle operates. It may be difficult to obtain a fully accurate model covering the system dynamics under all operational conditions. Also, using a highly nonlinear model in the MPC prediction process may increase the computational complexity and tuning difficulty of the controller. Merely by way of example with respect to an autonomous truck, the challenge may be manifested as insufficient deceleration when the truck is following another vehicle that is decelerating gradually. Even a small tracking error in deceleration can lead to a large speed tracking error due to, e.g., error integration. One or both challenges described above, and other challenges or problem, may exist despite a reliable design and/or validation of a longitudinal speed control in autonomous driving.

To address these and other technical challenges or problems, embodiments of the present document include systems and methods for offline and/or online compensation for model predictive control in autonomous driving. Some embodiments relate to the determination of control instructions with offline and/or online compensation for proper vehicle level actuation including, e.g., engine torque demand, foundation brake pressure demand, and engine brake torque demand, in order for the vehicle to operate along a route based on reference information (regarding, e.g., position s and/or speed v) provided by the upper stream kinematic control. Some embodiments of the present document include an offline compensation (e.g., compensation based on one or multi-dimensional context information) and an online compensation (e.g., compensation based on real-time feedback that is indicative of a derivation of the actual operation of the vehicle from the reference information) jointly and collaboratively applied in the determination of control instructions.

The offline compensation may account for specific context of an operation of the vehicle in the determination of control instructions for the vehicle. Example such context information may include a road geometry (e.g., road curvature, road grade, road width, lane width, etc.) at a location along the route, the weight of the vehicle (plus a load the truck carries), or the like, or a combination thereof. The context information may be static (constant) relative to the vehicle operation. For example, once a route the vehicle is to travel along is determined, the context information regarding the road geometry may be determined based on, e.g., a map that includes the route. Accordingly, the context compensation may be determined offline (e.g., before the vehicle starts, during a non-operational period when the vehicle is not actively driving, or preceding the time when the operation of the vehicle according to a control instruction determined based on the context compensation information by at least a threshold time interval).

The online compensation may account for dynamic factors during an operation of the vehicle in the determination of control instructions for the vehicle. Examples of such dynamic factors may include wind gust, an irregularity in an upstream glitch (e.g., in the planning module, in the perception module), a road condition (e.g., being slippery due to a weather condition such as rain, snow, etc.), a change in the condition of the vehicle (e.g., aging, wear), a glitch in the execution of a control instruction by the vehicle, or the like, or a combination thereof. In some embodiments, the online compensation is determined based on feedback that is indicative of a deviation of the real-time operation of the vehicle from its intended operation (e.g., described using reference information, planning information, etc.) regardless of the source of the deviation, thereby obviating the need to develop respective models for specific contributing factors. In some embodiments, the online compensation may correct or modulate the offline compensation that may be excessive or insufficient and therefore contribute at least in part to the deviation. The feedback may be obtained real time such that the online compensation may be determined real time and applied to correct control instructions and the vehicle operation real time.

By incorporating both an online compensation and an offline compensation collaboratively, embodiments of the present document may enhance real-time decision-making capabilities involved in the autonomous driving. The online compensation may facilitate immediate responses to real-time data, thereby ensuring timely reactions to dynamic changes, while the offline compensation may refine the decision-making process based on historical data and accumulated insights, leading to improved accuracy and reliability.

By implementing compensation as a multi-step process, embodiments of the present document may efficiently utilize computational resources by dividing tasks between the online and offline portions. The online portion may handle time-sensitive and/or real-time data processing, reducing latency and computational load, while the offline portion may engage in a more complex, resource-intensive computations during idle periods. As a result, embodiments of the present document may achieve improved or optimal resource allocation and maintain responsiveness even under high demand, which in turn may reduce infrastructure requirements (e.g., processing capacities or hardware). The combination of online and offline compensations may achieve a balance between computational efficiency and performance, resulting in a cost-efficient implementation thereof.

The combination of compensation and an offline compensation collaboratively, embodiments of the present document may provide robust performance in unstable or unusual environments. The online portion may adapt quickly to rapid changes, unforeseen events, and/or inaccurate compensation form the offline portion (due to, e.g., a deviation of actual context information (e.g., road geometry) from the context information retrieved from a context information source (e.g., a map), the actual context not sufficiently represented by a context compensation model used to determine the context compensation, or the like, or a combination thereof), thereby achieving or ensuring stability and resilience even in challenging conditions or periods of data scarcity.

The offline compensation may be determined using a context compensation model by utilizing large datasets, long time windows, and advanced training techniques, enabling the acquisition of deep insights and fine-tuning of model parameters. The learnings from the offline model may then be effectively used in determining the context compensated control instruction for operating the vehicle, reducing the amount of compensation to be made by and/or the processing time of the online portion, thereby enhancing the smoothness and/or overall performance of the vehicle operation.

FIG. 1 illustrates a block diagram of an example vehicle ecosystem according to some embodiments of the present disclosure. The system 100 may include an autonomous vehicle 105, such as a tractor unit of a semi-trailer truck. The autonomous vehicle 105 may include a plurality of vehicle subsystems 140 and an in-vehicle control computer 150. The plurality of vehicle subsystems 140 can include, for example, vehicle drive subsystems 142, vehicle sensor subsystems 144, and vehicle control subsystems 146. FIG. 1 shows several devices or systems being associated with the autonomous vehicle 105. In some embodiments, additional devices or systems may be added to the autonomous vehicle 105, and in some embodiments, some of the devices or systems shown in FIG. 1 may be removed from the autonomous vehicle 105.

An engine/motor, wheels and tires, a transmission, an electrical subsystem, and/or a power subsystem may be included in the vehicle drive subsystems 142. The engine/motor of the autonomous truck may be an internal combustion engine (or gas-powered engine), a fuel-cell powered electric engine, a battery powered electric engine/motor, a hybrid engine, or another type of engine capable of actuating the wheels on which the autonomous vehicle 105 (also referred to as vehicle 105 or truck 105) moves. The engine/motor of the autonomous vehicle 105 can have multiple engines to drive its wheels. For example, the vehicle drive subsystems 142 can include two or more electrically driven motors.

The transmission of the vehicle 105 may include a continuous variable transmission or a set number of gears that translate power created by the engine of the vehicle 105 into a force that drives the wheels of the vehicle 105. The vehicle drive subsystems 142 may include an electrical system that monitors and controls the distribution of electrical current to components within the vehicle drive subsystems 142 (and/or within the vehicle subsystems 140), including pumps, fans, actuators, in-vehicle control computer 150 and/or sensors (e.g., cameras, LiDARs, RADARs, etc.). The power subsystem of the vehicle drive subsystems 142 may include components which regulate a power source of the vehicle 105.

Vehicle sensor subsystems 144 can include sensors which are used to support general operation of the autonomous truck 105. The sensors for general operation of the autonomous vehicle may include, for example, one or more cameras, a temperature sensor, an inertial sensor, a global positioning system (GPS) receiver, a light sensor, a LiDAR system, a radar system, and/or a wireless communications system.

The vehicle control subsystems 146 may include various elements, devices, or systems including, e.g., a throttle, a brake unit, a navigation unit, a steering system, and an autonomous control unit. The vehicle control subsystems 146 may be configured to control operation of the autonomous vehicle, or truck, 105 as a whole and operation of its various components. The throttle may be coupled to an accelerator pedal so that a position of the accelerator pedal can correspond to an amount of fuel or air that can enter the internal combustion engine. The accelerator pedal may include a position sensor that can sense a position of the accelerator pedal. The position sensor can output position values that indicate the positions of the accelerator pedal (e.g., indicating the amount by which the accelerator pedal is actuated.)

The brake unit can include any combination of mechanisms configured to decelerate the autonomous vehicle 105. The brake unit can use friction to slow the wheels of the vehicle in a standard manner. The brake unit may include an anti-lock brake system (ABS) that can prevent the brakes from locking up when the brakes are applied. The navigation unit may be any system configured to determine a driving path or route for the autonomous vehicle 105. The navigation unit may additionally be configured to update the driving path dynamically based on, e.g., traffic or road conditions, while, e.g., the autonomous vehicle 105 is in operation. In some embodiments, the navigation unit may be configured to incorporate data from a GPS device and one or more predetermined maps so as to determine the driving path for the autonomous vehicle 105. The steering system may represent any combination of mechanisms that may be operable to adjust the heading of the autonomous vehicle 105 in an autonomous mode or in a driver-controlled mode of the vehicle operation.

The autonomous control unit may include a control system (e.g., a computer or controller comprising a processor) configured to identify, evaluate, and avoid or otherwise negotiate potential obstacles in the environment of the autonomous vehicle 105. In general, the autonomous control unit may be configured to control the autonomous vehicle 105 for operation without a driver or to provide driver assistance in controlling the autonomous vehicle 105. In some example embodiments, the autonomous control unit may be configured to incorporate data from the GPS device, the radar, the LiDAR, the cameras, and/or other vehicle sensors and subsystems to determine the driving path or trajectory for the autonomous vehicle 105.

An in-vehicle control computer 150, which may be referred to as a vehicle control unit or VCU, can include, for example, any one or more of: a vehicle subsystem interface 160, a map data sharing module 165, a driving operation module 168, one or more processors 170, and/or memory 175. This in-vehicle control computer 150 may control many, if not all, of the operations of the autonomous truck 105 in response to information from the various vehicle subsystems 140. The memory 175 may contain processing instructions (e.g., program logic) executable by the processor(s) 170 to perform various methods and/or functions of the autonomous vehicle 105, including those described in this patent document. For instance, the data processor 170 executes the operations associated with vehicle subsystem interface 160, map data sharing module 165, and/or driving operation module 168. The in-vehicle control computer 150 can control one or more elements, devices, or systems in the vehicle drive subsystems 142, vehicle sensor subsystems 144, and/or vehicle control subsystems 146. For example, the driving operation module 168 in the in-vehicle control computer 150 may operate the autonomous vehicle 105 in an autonomous mode in which the driving operation module 168 can send instructions to various elements or devices or systems in the autonomous vehicle 105 to enable the autonomous vehicle to drive along a determined trajectory. For example, the driving operation module 168 can send instructions to the steering system to steer the autonomous vehicle 105 along a trajectory, and/or the driving operation module 168 can send instructions to apply an amount of brake force to the brakes to slow down or stop the autonomous vehicle 105.

The map data sharing module 165 can be also configured to communicate and/or interact via a vehicle subsystem interface 160 with the systems of the autonomous vehicle. The map data sharing module 165 can, for example, send and/or receive data related to the trajectory of the autonomous vehicle 105 as further explained in Section II. The vehicle subsystem interface 160 may include a software interface (e.g., application programming interface (API)) through which the map data sharing module 165 and/or the driving operation module 168 can send or receive information to one or more devices in the autonomous vehicle 105.

The memory 175 may include instructions to transmit data to, receive data from, interact with, or control one or more of the vehicle drive subsystems 142, vehicle sensor subsystems 144, or vehicle control subsystems 146. The in-vehicle control computer (VCU) 150 may control the operation of the autonomous vehicle 105 based on inputs received by the VCU from various vehicle subsystems (e.g., the vehicle drive subsystems 142, the vehicle sensor subsystems 144, and the vehicle control subsystems 146). The VCU 150 may, for example, send information (e.g., commands, instructions, or data) to the vehicle control subsystems 146 to direct or control functions, operations or behavior of the autonomous vehicle 105 including, e.g., its trajectory, velocity, steering, braking, and signaling behaviors. The vehicle control subsystems 146 may receive a course of action to be taken from one or more modules of the VCU 150 and may, in turn, relay instructions to other subsystems to execute the course of action.

Figure 2:
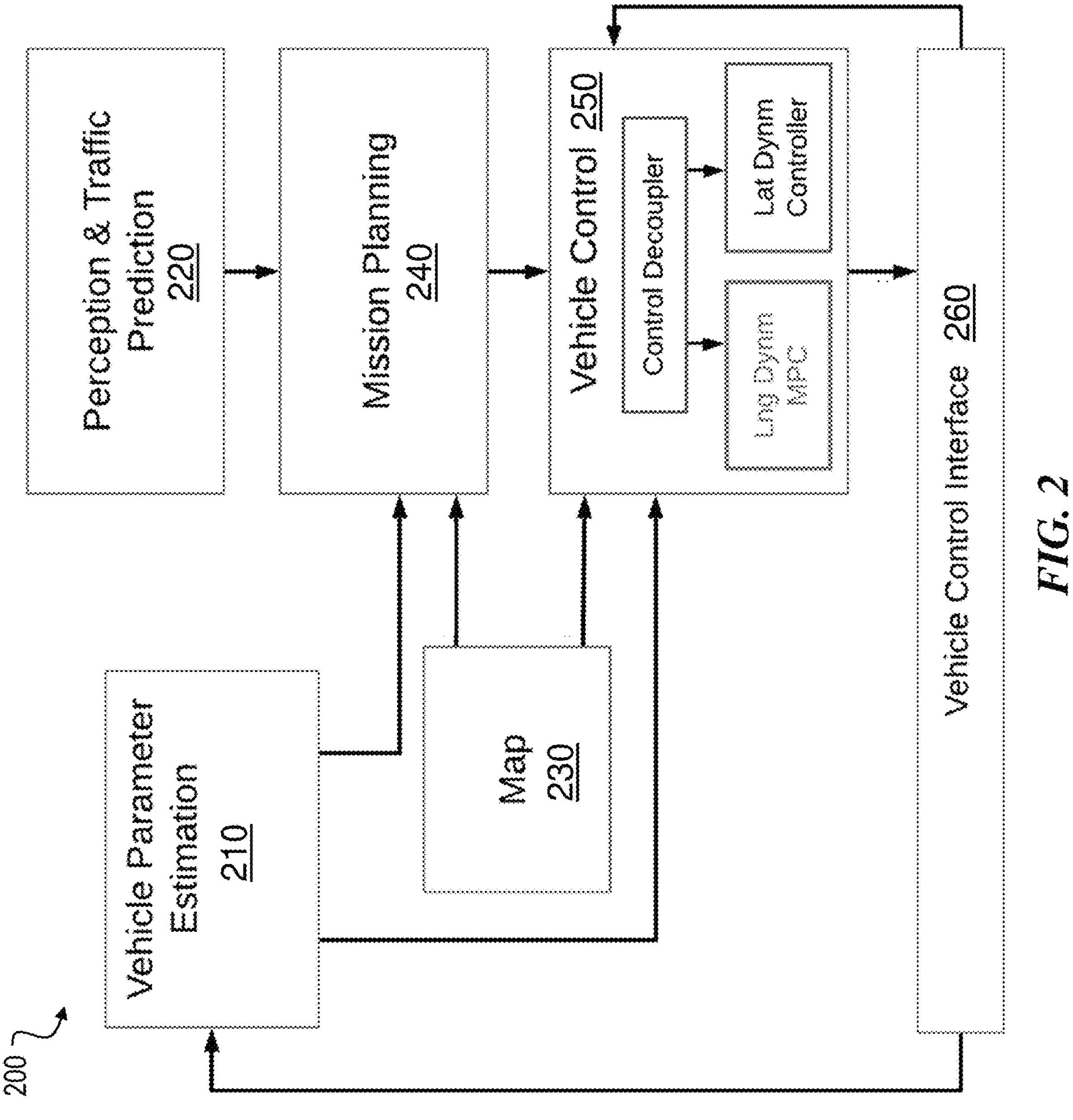
FIG. 2 shows an example of a hardware platform that can implement some methods and techniques described in the present document.

FIG. 2 shows a block diagram of an example autonomous driving system 200 that implements embodiments of the present document, which leverage the capabilities of MPC and enhanced by offline-online collaborative compensation. As shown therein, an example autonomous driving system 200 includes a vehicle parameter estimation module 210, a perception and traffic prediction module 220, a map module 230, a mission planning module 240, a vehicle control module 250, and a vehicle control interface 260. In some embodiments, the perception and traffic prediction module 220 can be configured to provide a context for driving situations, label the states of various nearby vehicles, identify instantaneous driving intentions, and predict future states of key neighboring vehicles. In some embodiments, the mission planning module 240 can be configured to use an abstracted ego vehicle motion model into the aforementioned driving situation context and generate an abstracted driving mission plan for a few seconds of time into the future, or referred to as a preview horizon or prediction horizon.

In some embodiments, the vehicle control module 250 includes a control decoupler that is operably connected to the lateral dynamic controller and the longitudinal dynamic MPC, which generate control commands or instructions with offline and/or online compensation that are transmitted to the powertrain of the vehicle via the vehicle control interface 260. In some embodiments, the vehicle control interface 260 may also be configured to feedback time-series data from the powertrain and other engine domain and wheel domain components to the vehicle parameter estimation module 210. The following description is provided with reference to a longitudinal motion control for illustration purposes, without the intention to be limiting. It is understood that the disclosed technology can be applied in lateral motion control.

Figure 3:
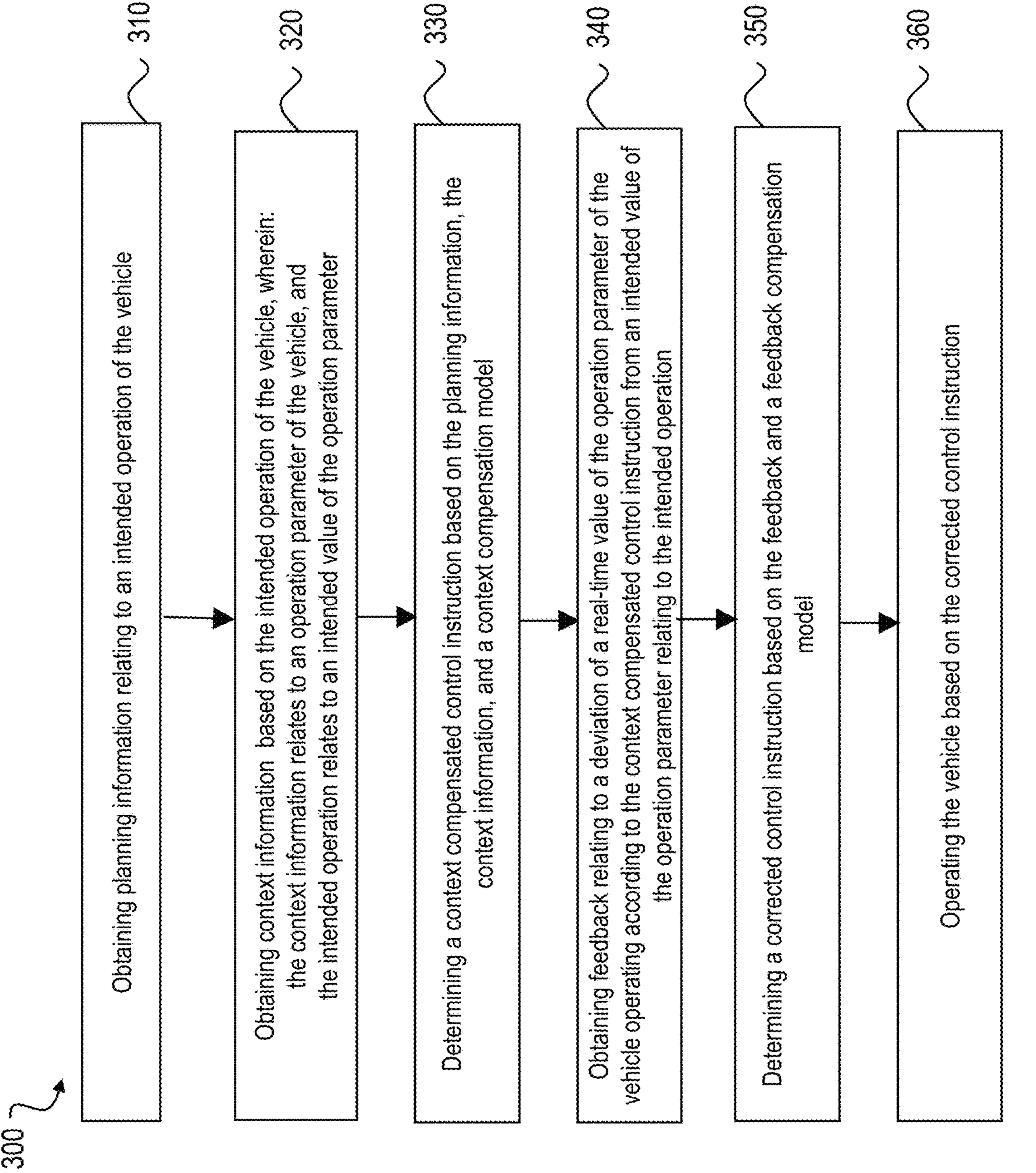
FIG. 3 shows a flowchart of a process for operating a vehicle according to some embodiments of the present disclosure.

FIG. 3 shows a flowchart of a process for operating a vehicle according to some embodiments of the present disclosure. The system 100, the system 200, or a portion thereof, may perform one or more operations of the process 300. For example, the VCU 150 or the vehicle control module 250 may perform at least a portion of the process 300.

At 310, the process 300 may obtain planning information relating to an intended operation of the vehicle. The intended operation of the vehicle may include a route for the vehicle to travel from a starting point to a destination. The planning information may include waypoints along the route, time points at which the vehicle traverses the respective waypoints, or the like, or a combination thereof. For example, the mission planning module 240 may determine the planning information based on the intended operation. The intended operation may relate to an intended value of an operation parameter. Examples of the operation parameter of the vehicle may include a position, velocity, acceleration, or the like, or a combination thereof. For example, based on the intended operation, the planning information may include an intended value (also referred to as a reference value) of the velocity or position of the vehicle at a specific time point.

At 320, the process 300 may obtaining context information based on the intended operation of the vehicle. The context information may relate to an environment in which the vehicle is to operate following the planning information. For example, the intended operation includes a route for the vehicle to traverse, and the context information may include a road geometry of the route. Examples of road geometry may include road curvature, road grade, road width, lane width, or the like, or a combination thereof. Based on information regarding the route, the process 300 may obtain the context information including the road geometry from a map that includes the route. The context information may provide information regarding the amount of additional resistance at a turn the vehicle is to encounter compared to a substantially straight road (with a small or no curvature) such that the amount of engine torque may need to be adjusted based on the road curvature to achieve an intended value of the velocity or position of the vehicle at a specific time point. As another example, the intended operation includes that the vehicle carries a load, and the context information may include the weight of the vehicle plus the load that relates to an additional amount of force needed when the vehicle accelerates so that the amount of engine torque or engine brake torque may need to be adjusted accordingly. As used herein, the rate of vehicle velocity increase or decrease (i.e. deceleration) is referred to as acceleration for brevity.

The context information may be static (e.g., remain substantially constant) during the intended operation of the vehicle. For example, the road geometry of a route may be considered static during the intended operation of the vehicle. As another example, the weight of the vehicle plus the load it carries may be considered static during an intended operation of the vehicle.

At 330, the process 300 may a context compensated control instruction based on the planning information, the context information, and a context compensation model. In some embodiments, the process 300 may determine, using the context compensation model and the context information, context compensation information, and determine the context compensated control instruction based on the planning information and the context compensation information. For example, the context information includes a road curvature at a turn; the context compensation model receives the context information as input and outputs the context compensation information including the amount of additional force needed for the vehicle to compensate the additional resistance for the vehicle make the turn (compared to the vehicle travelling on a substantially straight road) while sticking to or approaching the intended value of an operation parameter; the process 300 determines the context compensated control instruction based on the context compensation information.

The process 300 may determine the context compensated control instruction in a two-step process including determining a preliminary control instruction based on the planning information (without considering the context information or context compensation information), and then determining the context compensated control instruction based on the preliminary control instruction and the context compensation information. For example, the process 300 may determine the context compensated control instruction by correcting the preliminary control instruction based on the context compensation information. Alternatively, the process 300 may determine the context compensated control instruction in a single step process by combining the context compensation information and the planning information and determining the context compensated control instruction. For example, to determine a context compensated control instruction regarding engine torque for the vehicle to make a turn (e.g., on a local road with a low speed limit compared to on a freeway), instead of determining a resistance without considering the road curvature, the process 300 may take the road curvature into consideration simultaneously along with the planning information including, e.g., one or more waypoints and/or velocities at respective time point(s) for the vehicle to make the turn.

In some embodiments, the context compensation model may include a parametric probabilistic model. Merely by way of example, the context compensation model may be a Gaussian mixture model (GMM) that includes multiple Gaussian distributions in a mixed form. The context compensation model may be determined based on driving data (also referred to as data samples, data points) collected from prior operations of the vehicle or another vehicle where at least a portion of the context information was present. The context compensation model may be determined offline to take advantage of the abundant availability of computational resources and/or processing time so that substantial amount of data sample may be used in determining the context compensation model (e.g., GMM), allowing the context compensation model to be more robust, accurate, and representative of the underlying data distribution. More descriptions regarding the GMM may be found elsewhere in the present document at, e.g., FIGS. 4 and 5 and the description thereof.

The context information may be static with respect to an intended operation of the vehicle. Accordingly, at least a portion of the context compensation with respect to the control instruction may be determined offline, thereby alleviating the computational demand at the online stage of the decision-making process in the autonomous driving, and/or improving performance (e.g., improving smoothness) of the vehicle operation.

At 340, the process 300 may obtain feedback relating to a deviation of a real-time value of the operation parameter of the vehicle operating according to the context compensated control instruction from an intended value of the operation parameter relating to the intended operation. The deviation reflected in the feedback may be caused by one or more contributing factors specific to the operation of the vehicle. Examples of such contribution factors may include wind gust, a road condition at the time of the vehicle operation (e.g., being slippery due to rain, being icy, etc.), an irregularity in an upstream glitch (e.g., in the planning module, in the perception module), a change in the condition of the vehicle (e.g., aging, wear), a glitch in the execution of a control instruction by the vehicle, or the like, or a combination thereof. Additionally or alternatively, the deviation reflected in the feedback may be caused by excessive or insufficient context compensation. By way of the feedback compensation, deviations caused by various contributing factors may be accounted for, obviating the need to identify the source(s) of a deviation and/or to develop different compensation models for different contribution factors.

In some embodiments, the process 300 may receive sensor data that correspond to the real time vehicle operation (e.g., according to a current control instruction with or without context compensation) and obtain the real-time value of an operation parameter based on the sensor data, and determine the deviation by comparing the real-time value of the operation parameter from the intended value thereof. The sensor data may be acquired by, e.g., one or more sensors of the vehicle sensor subsystems 144 as illustrated in FIG. 1, one or more sensors configured to monitor operation of the vehicle drive subsystems 142 as illustrated in FIG. 1, or the like, or a combination thereof.

At 350, the process 300 may determine a corrected control instruction based on the feedback and a feedback compensation model. The process 300 may determine feedback compensation by inputting the feedback to the feedback compensation model, and determine the corrected control instruction by correcting the control instruction (e.g., the current control instruction with or without the context compensation) based on the feedback compensation.

The feedback compensation model may receive the feedback as input and output a feedback compensation. The amount of the feedback compensation may be proportional to the magnitude of the deviation. The feedback compensation model may include a modulating factor to modulate the sensitivity of the feedback compensation to the magnitude of the deviation so as to improve the smoothness of the vehicle operation. Additionally or alternatively, the modulating factor may relate to the type of error reflected in the deviation. In some embodiments, a deviation that suggests or relates to a safety concern (e.g., a risk of collision) may be associated with a more sensitive feedback compensation than a deviation that suggests or relates to a non-safety concern (e.g., fuel efficiency, punctuality of a trip). For example, the modulating factor may be set such that for a deviation in which the real time value of acceleration for slowing down the vehicle (e.g., to prevent a collision) is lower than the intended value, the feedback compensation is more significant than for a deviation in which the real time value of acceleration for speeding up the vehicle (e.g., to ensure punctuality of a trip).

While the feedback compensation is performed online, the feedback compensation model may be determined offline. In some embodiments, there may be multiple feedback compensation models configured to determine feedback compensation under different scenarios (e.g., safety related scenarios (e.g., braking events) and non-safety related scenarios (e.g., scenarios primarily for fuel efficiency consideration).

At 360, the process 300 may operate the vehicle based on the corrected control instruction.

Figure 4:
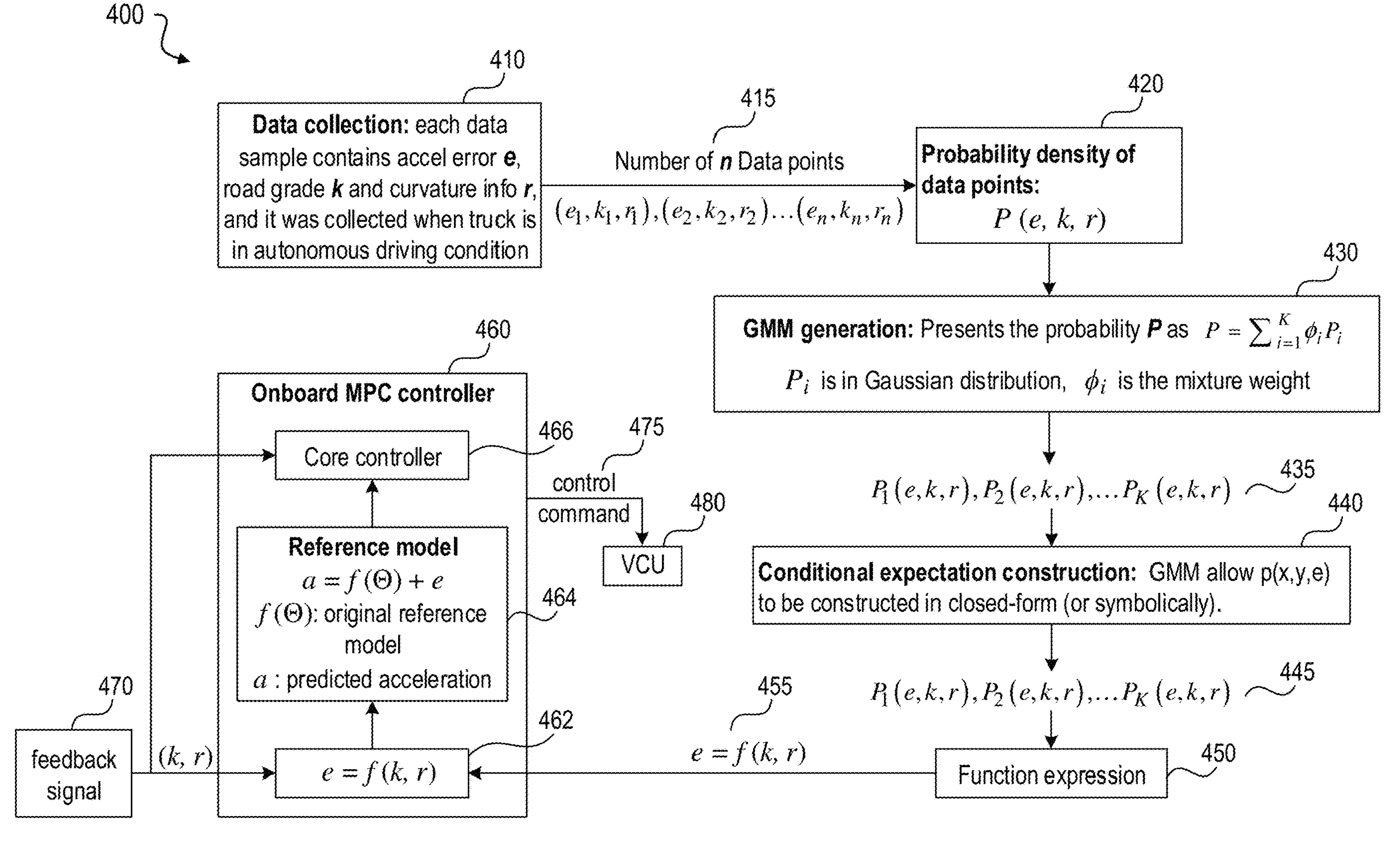
FIG. 4 shows a Gaussian mixture model (GMM) pipeline according to some embodiments of the present document.

FIG. 4 shows an GMM pipeline 400 according to some embodiments of the present document. The GMM pipeline 400 may be implemented on one or more processors. For example, the VCU 150 or the vehicle control module 250 may perform at least a portion of the pipeline 400. In some embodiments, the GMM may be determined on the VCU 150 or the vehicle control module 250 offline. In some embodiments, the GMM may be determined on one or more processors outside the system 100 or 200, and store on the system 100 or 200 for use in operating the vehicle.

At 410, the GMM may be determined using driving data (or referred to as data samples or data points) collected from prior road tests in which the vehicle or one or more other vehicles each made a turn on a local road under the autonomous driving condition. As illustrated in FIG. 4, each data sample/point may include a value of each of one or more operation parameters (e.g., velocity, position, acceleration) in a road test and a corresponding reference value (e.g., relating to the planning information), an error in the value of an operation parameter (e.g., e in acceleration), and corresponding context information (e.g., road curvature k, road grade r). Merely by way of example, as illustrated as 415, n data points including $(e_1, k_1, r_1)$, $(e_2, k_2, r_2)$, . . . $(e_n, k_n, r_n)$ may be used in determining GMM. In some embodiments, the data points may include additional information. For example, a data point may also include the velocity at the corresponding time point. If multiple operation parameters behave in a substantially similar manner, only a portion (e.g., one) of the multiple parameters may need to be used in the determination of the GMM. For example, the velocity may behave substantially similarly to the road curvature in the GMM determination, and only the road curvature (instead of both the velocity and the road curvature) may be used in the GMM determination. Additionally or alternatively, some information may have insignificant impact on the GMM determination and may be omitted from the GMM determination.

Figure 5:
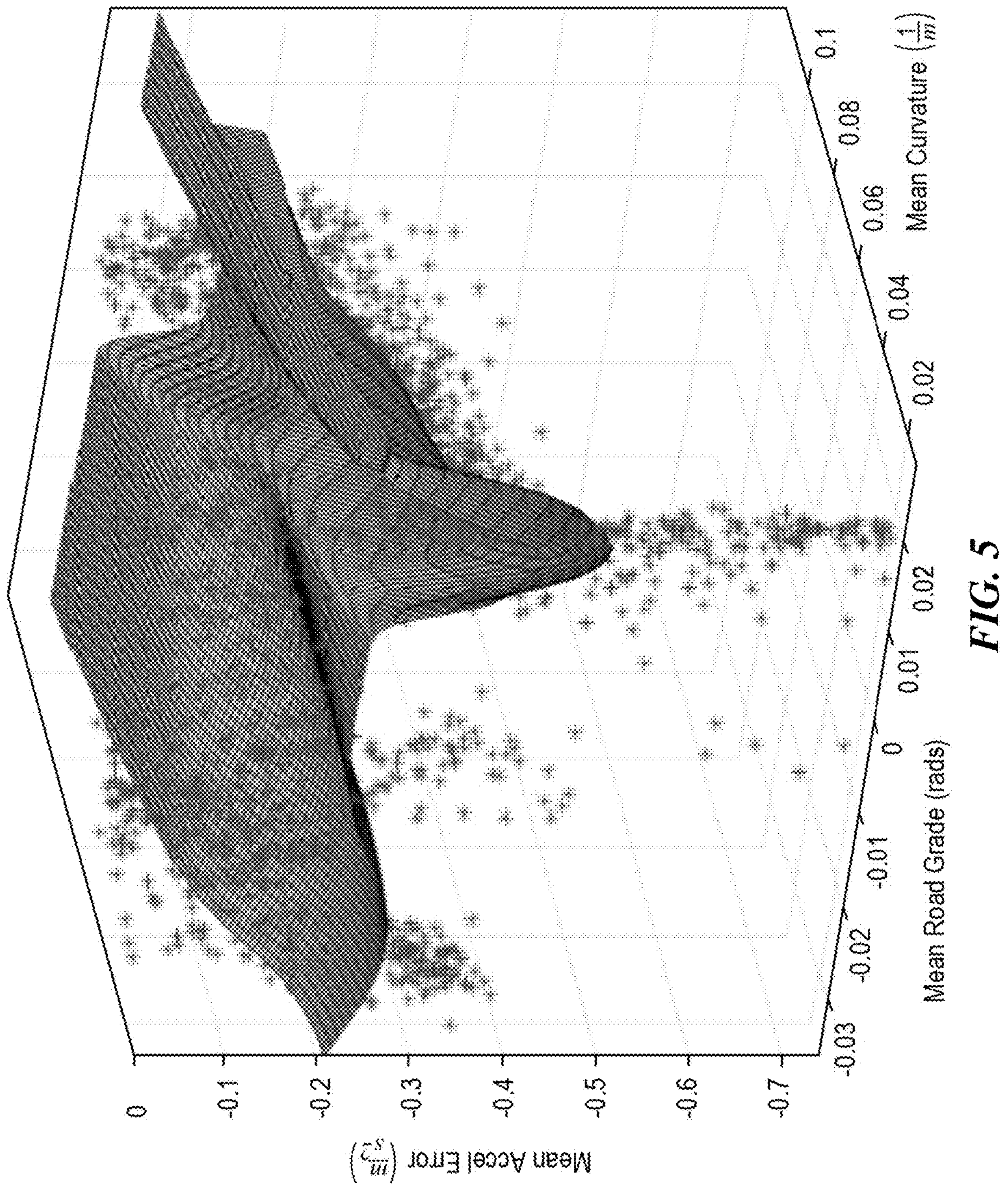
FIG. 5 shows data points and fitted surface in determining an GMM according to some embodiments of the present document.

The GMM may be represented by a plurality of Gaussian components, e.g., K Gaussian components where K is a positive integer. Each of the plurality of Gaussian components may be characterized using features including, e.g., a mean value (e.g., mean acceleration in the example illustrated in FIGS. 4 and 5) and a mixture weight ($\varnothing_i$ at 430 in FIG. 4). The data points may be plotted as illustrated as crosses in FIG. 5. At 420, the probability density of the data points P (e, k, r) may be determined. At 430, for GMM generation, P may be presented as $$P = \sum_{i=1}^{K} \phi_i P_i, \quad (1)$$

in which Pi is a Gaussian distribution (also referred to as Gaussian component), and $\varnothing_i$ is the mixture weight. As illustrated at 435, the Gaussian components may include $P_1(e, k, r)$, $P_2(e, k, r)$, . . . . $P_K(e, k, r)$. At 440, the GMM may be converted to a form to facilitate convenient use during a vehicle operation. For example, the GMM may be converted by, e.g., conditional expectation construction in which GMM allows P to be constructed in a closed form or symbolically, as illustrated in 445, to be conveniently applied in real time decision making in autonomous driving. That is, P (e, k, r) may be converted/reformatted to $E_1(e|k, r)$, $E_2(e|k, r)$, $E_K(e|k, r)$ on the basis of which a function expression of the GMM may be determined at 450. As illustrated in FIG. 5, the conversion/reformatting may be performed by surface fitting the data points. As illustrated at 455, the function expression may be as follows:

$$e = f(k, r) \quad (2)$$

Accordingly, the error (e.g., error in acceleration) may be determined conveniently by inputting the road curvature k and the road grade r to the function (2).

The function (2) so determined may be stored on the onboard MPC controller and used as the context compensation model in controlling the vehicle operation at 460. In use, the function (2) may receive the road curvature k and the road grade r as input (as indicated by (k, r) input to the function (2) from 470 at 462 as illustrated in FIG. 4) and output context compensation information e at 462. The context compensation information e may be taken into consideration with the original reference model (e.g., MPC control model without context compensation or another form of compensation) to provide a context compensated model (or control instructions) at 464. In some embodiments, at 466, the core controller may receive the context compensated model and a feedback signal from 470 to determine a feedback compensation and a corrected control instruction (also referred to as control command). The control instruction (with context compensation and/or feedback compensation) 475 from the onboard MPC controller may be provided to the vehicle control unit 480 according to which the vehicle operates.

FIGS. 4 and 5 illustrated context compensation based on road curvature and road grade. It is understood that this is for illustrated purposes, and not intended to be limiting. GMM may be developed for other context information and for a different (e.g., higher or lower) dimension of variables.

Figure 6:
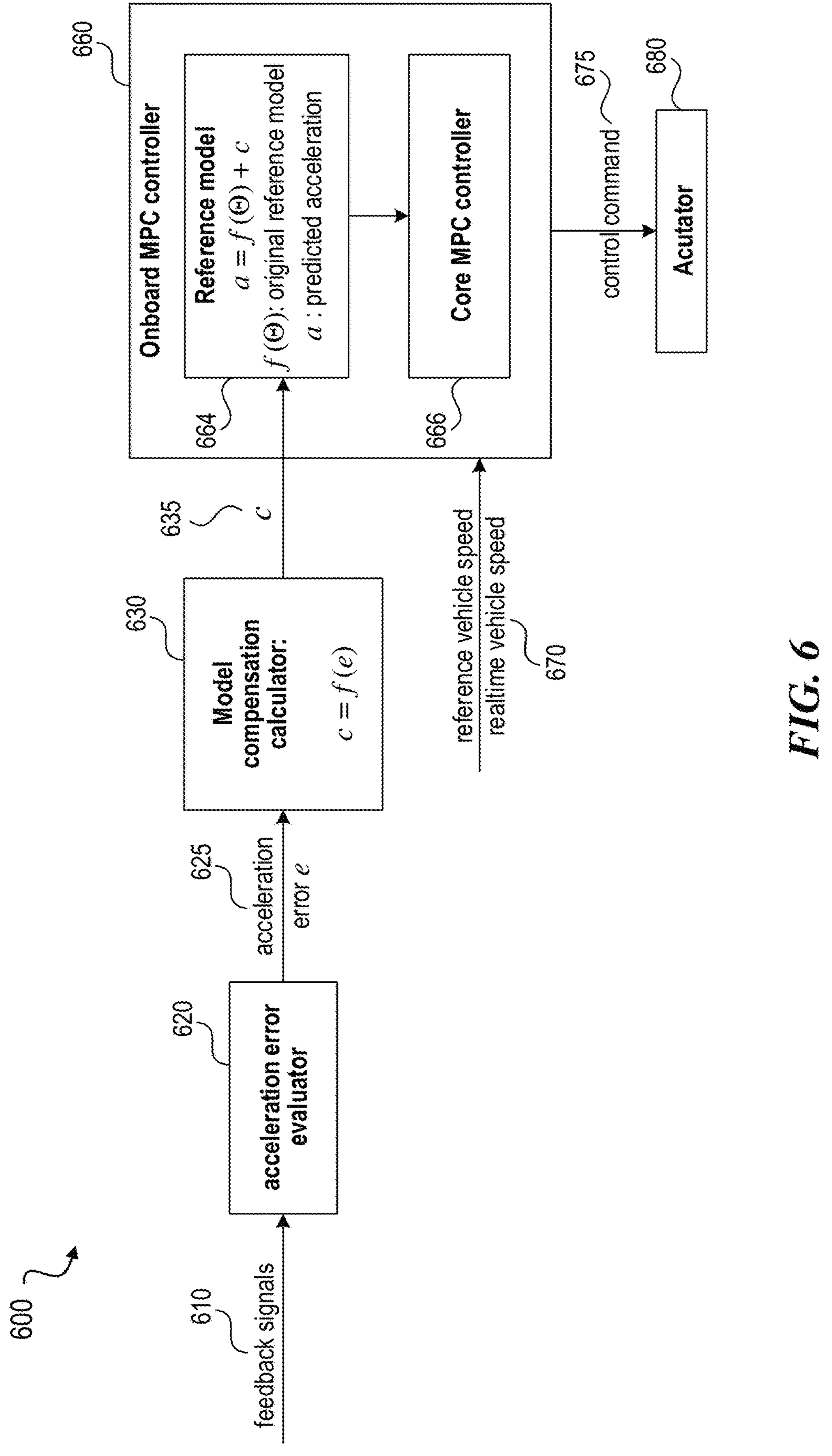
FIG. 6 shows a feedback compensation pipeline according to some embodiments of the present document.

FIG. 6 shows a feedback compensation pipeline according to some embodiments of the present document. The feedback compensation pipeline 600 may be implemented on one or more processors. For example, the VCU 150 or the vehicle control module 250 may perform at least a portion of the pipeline 600. In some embodiments, the GMM may be determined on the VCU 150 or the vehicle control module 250 offline. In some embodiments, the feedback compensation model may be determined on one or more processors outside the system 100 or 200, and store on the system 100 or 200 for use in operating the vehicle.

At 610, a feedback signal 610 may be provided to an acceleration error evaluator at 620. The feedback signal 610 may indicate a deviation of a real-time value of an operation parameter of the vehicle (e.g., a real-time vehicle speed at a specific location along a route) from an intended value of the operation parameter (e.g., reference vehicle speed at the specific location along the route) relating to the intended operation of the vehicle. The acceleration error evaluator at 620 may determine a deviation between the error expressed in the form of an acceleration error e 625 as the feedback and at 630 provide the acceleration error e to model compensation calculator c=f (e) (e.g., a feedback compensation model) on the basis of which feedback compensation c may be determined and at 635 fed to the onboard MPC controller and used to provide feedback compensation in controlling the vehicle operation at 660. In use, the feedback compensation c may be taken into consideration with the original reference model (e.g., MPC control model without context compensation or another form of compensation) to provide a corrected (e.g., feedback compensated) model (or control instructions) at 664. The original reference model may include the reference vehicle speed as part of the input 670 to the onboard MPC controller 660 (e.g., to the reference model 664). In some embodiments, at 666, the core MPC controller may determine a corrected control instruction (also referred to as control command). A corrected (feedback compensated) control instruction 675 from the onboard MPC controller may be provided, via a VCU, to the actuator 680 to operate the vehicle.

The pipeline as illustrated in FIG. 6 omits a context compensation in the control instruction. It is understood that context compensation and feedback compensation may be used alone or in combination in operating the vehicle under an autonomous driving condition.

Some embodiments of the present document include a system for operating a vehicle. See, e.g., the system 200 as illustrated in FIG. 2. The system may include a mission planning module, a vehicle control module, and a vehicle control interface. The mission planning module may be configured to configured to provide planning information relating to an intended operation of the vehicle. The vehicle control module may be configured to perform operations including: obtaining, from the mission planning module, the planning information; obtaining context information based on the intended operation of the vehicle; determining a context compensated control instruction based on the planning information, the context information, and a context compensation model; obtaining feedback relating to a deviation of a real-time value of the operation parameter of the vehicle operating according to the context compensated control instruction from an intended value of the operation parameter relating to the intended operation; and determining a corrected control instruction based on the feedback and a feedback compensation model. The vehicle control interface may be configured to cause the vehicle to operate based on a control instruction (e.g., context compensated control information or instruction, feedback compensated control information or instruction (also referred to as corrected control information or instruction)). The system may further include a perception module configured to acquire environmental information during the operation of the vehicle. The mission planning module may be configured to generate the planning information based on the environmental information. For example, the perception module may be configured to acquire the environmental information including information of an object in a vicinity of the vehicle.

Figure 7:
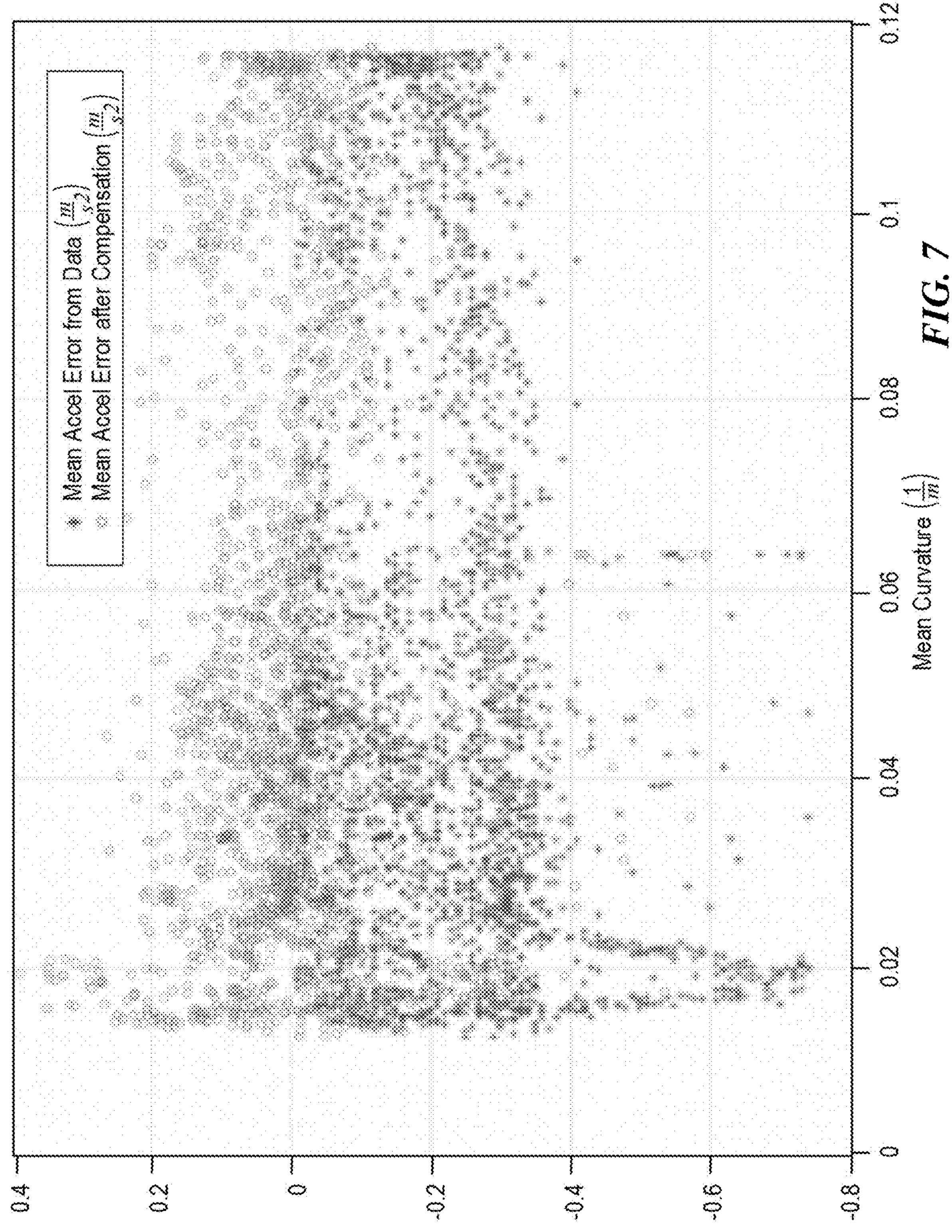
FIGS. 7 and 8 show performance comparisons between model predictive controller (MPC) without GMM and MPC with GMM with respect to compensation based on road curvature and road grade, respectively, according to some embodiments of the present document.
Figure 8:
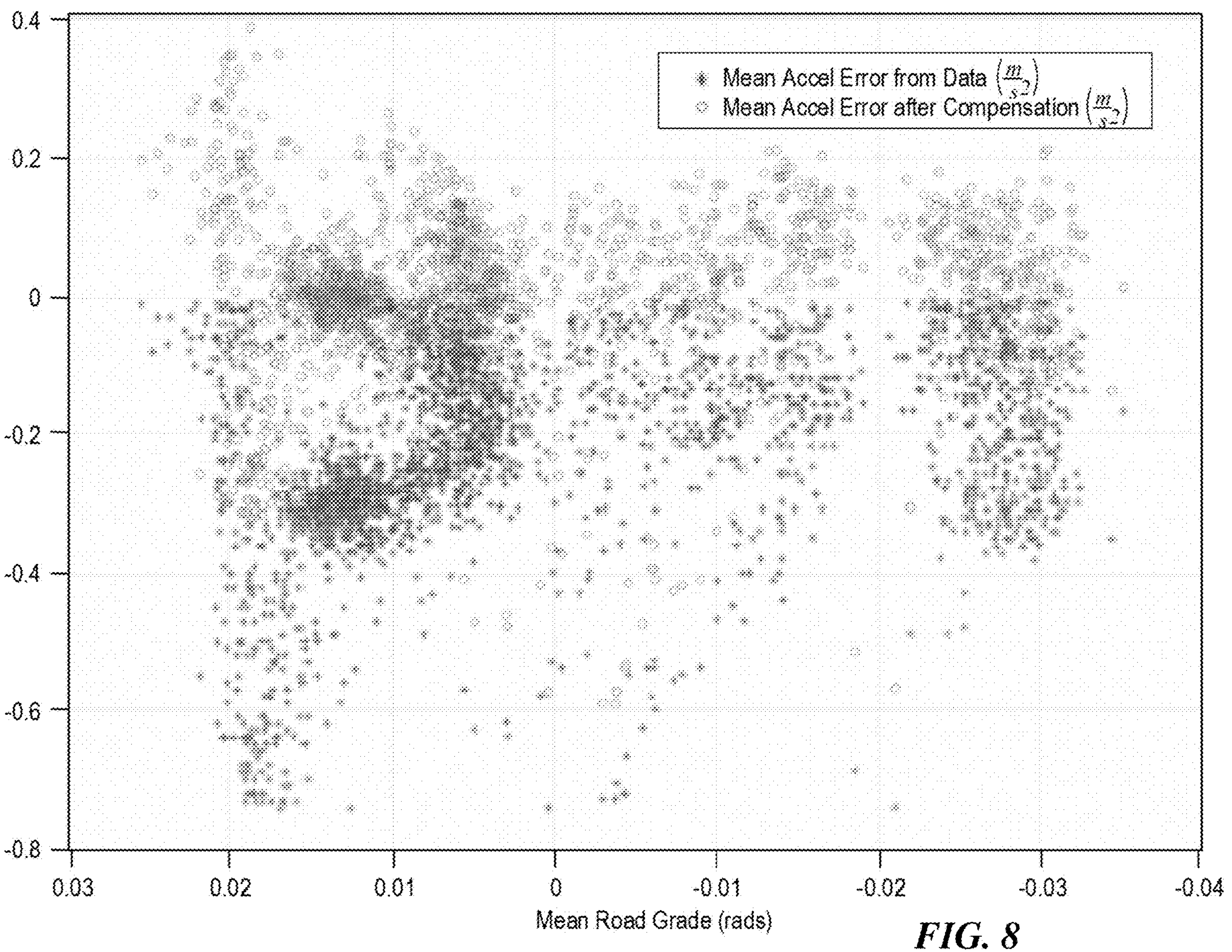

FIGS. 7 and 8 show performance comparisons between MPC without GMM and MPC with GMM with respect to context compensation based on road curvature and road grade, respectively, according to some embodiments of the present document. In FIG. 7, the horizontal axis is the mean curvature in the unit of 1/m, and the vertical axis is the mean acceleration error in the unit of m/sˆ2. In FIG. 8, the horizontal axis is the mean road grade in the unit of radian (rads), and the vertical axis is the mean acceleration error in the unit of m/sˆ2. In both figures, the open circles denote data corresponding to MPC with GMM, and the crosses denote data corresponding to MPC without GMM. The results in both figures indicate that the context compensation according to GMM reduced mean acceleration errors.

Figures 9, 10:
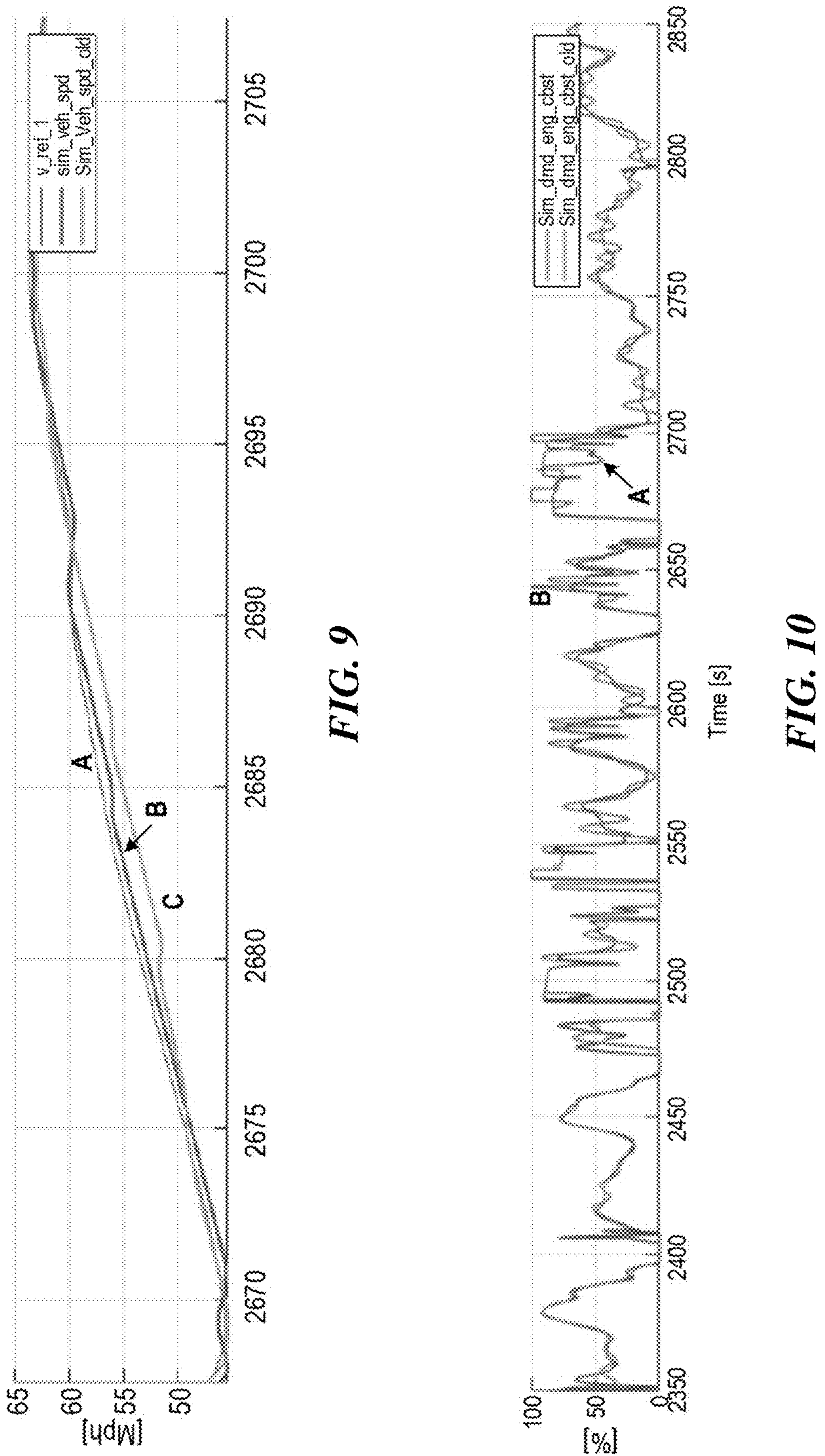
FIG. 9 shows performance comparison in speed tracking at acceleration events with and without feedback compensation according to some embodiments of the present document.
FIG. 10 shows performance comparison in throttle smoothness with and without feedback compensation according to some embodiments of the present document.

FIG. 9 shows performance comparison in speed tracking during acceleration with and without feedback compensation according to some embodiments of the present document. The horizontal axis is time in the unit of s, and the vertical axis is the vehicle velocity in the unit of miles per hour (MPH). The curve A shows the reference velocity of the vehicle (e.g., an intended value of the vehicle), the curve B shows the velocity of the vehicle according to MPC control with feedback compensation, and the curve C shows the velocity of the vehicle according to MPC control without feedback compensation. The results demonstrate that MPC control with feedback compensation may improve the vehicle performance in terms of speed tracking than MPC control without feedback compensation.

FIG. 10 shows performance comparison in throttle smoothness with and without feedback compensation according to some embodiments of the present document. The horizontal axis is time in the unit of s, and the vertical axis is the percentage of the throttle performance relative to its full capacity. The curve A and the curve B show the throttle behavior according to MPC control with and without feedback compensation, respectively. The results demonstrate that MPC control with feedback compensation may improve the vehicle performance in terms of throttle smoothness than MPC control without feedback compensation.

Figure 11:
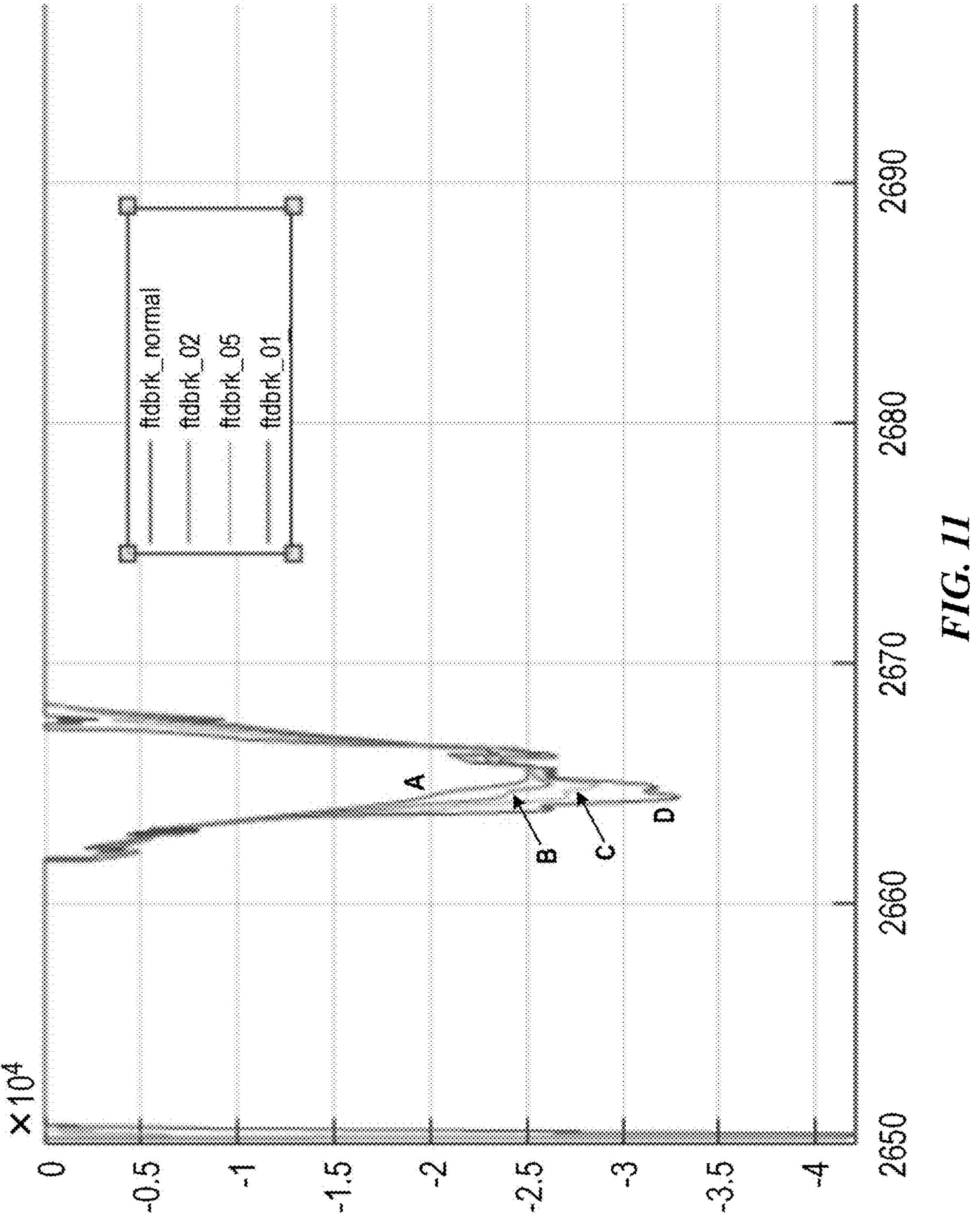
FIG. 11 shows performance comparison in brake response with various feedback compensation according to some embodiments of the present document.

FIG. 11 shows performance comparison in brake response with various feedback compensation according to some embodiments of the present document. The horizontal axis is time in the unit of s, and the vertical axis is the brake pressure in the unit of Nm. The curve A shows the foundation brake response of the vehicle without any compensation, and the curves B. C. and D show the brake response of the vehicle with 20%, 50%, and 100% of the acceleration compensation, respectively, determined according to some embodiments of the present document. The results were obtained by open loop re-simulation of a prior deceleration event in which no compensation was applied real-time, resulting in insufficient deceleration; in the re-simulation, various amounts of compensation were applied, including 20%, 50%, and 100% of the compensation determined according to some embodiments of the present document. The results demonstrate improved brake response when the compensation was applied.

Some example technical solutions are implemented as described below.

1. A method for controlling a vehicle, comprising: obtaining planning information relating to an intended operation of the vehicle, the intended operation relating to an intended value of an operation parameter of the vehicle; obtaining, based on the intended operation of the vehicle, context information relating to an environment in which the vehicle is to operate following the planning information (including, e.g., a road geometry of a route the vehicle is to traverse following the planning information); determining a context compensated control instruction based on the planning information and the context information; obtaining feedback relating to a deviation of a real-time value of the operation parameter of the vehicle operating according to the context compensated control instruction from the intended value of the operation parameter relating to the intended operation; determining a corrected control instruction based on the feedback; and operating the vehicle based on the corrected control instruction.

2. A method for operating a vehicle, comprising: obtaining planning information relating to an intended operation of the vehicle, the intended operation relating to an intended value of the operation parameter of the vehicle; obtaining, based on the intended operation of the vehicle, context information relating to an environment in which the vehicle is to operate following the planning information; determining a context compensated control instruction based on the planning information and the context information; and operating the vehicle based on the context compensated control instruction.

3. A method for operating a vehicle, comprising: obtaining planning information relating to an intended operation of the vehicle, the intended operation relating to an intended value of an operation parameter of the vehicle; obtaining feedback relating to a deviation of a real-time value of the operation parameter of the vehicle operating according to a control instruction determined based on the planning information from the intended value of the operation parameter relating to the intended operation; determining a corrected control instruction based on the feedback; and operating the vehicle based on the corrected control instruction.

4. The method of any one or more of the solutions herein, wherein: the intended operation comprises a route for the vehicle to traverse, the context information comprises a road geometry of the route, and obtaining the context information based on the intended operation of the vehicle comprises obtaining the road geometry from a map that includes the route.

5. The method of any one or more of the solutions herein, wherein determining the context compensated control instruction based on the planning information and the context information comprises: determining, using the context information, context compensation information; and determining the context compensated control instruction based on the planning information and the context compensation information.

6. The method of any one or more of the solutions herein, wherein determining the context compensated control instruction based on the planning information and the context compensation information comprises: determining a preliminary control instruction based on the planning information; and determining the context compensated control instruction based on the preliminary control instruction and the context compensation information.

7. The method of any one or more of the solutions herein, wherein at least a portion of the determination of the context compensated control instruction occurs offline.

8. The method of any one or more of the solutions herein, wherein obtaining the feedback comprises: operating the vehicle according to the context compensated control instruction; receiving sensor data that correspond to the operating of the vehicle according to the context compensated control instruction; obtaining the real-time value of the operation parameter based on the sensor data; and determining the deviation by comparing the real-time value of the operation parameter with the intended value of the operation parameter.

9. The method of any one or more of the solutions herein, wherein determining the corrected control instruction based on the feedback comprises: determining the corrected control instruction by correcting, based on the feedback, the context compensated control instruction.

10. The method of any one or more of the solutions herein, wherein the operation parameter comprises at least one of velocity, position, or acceleration of the vehicle.

11. A system for operating a vehicle, comprising: a mission planning module configured to provide planning information relating to an intended operation of the vehicle; a vehicle control module configured to perform operations including: obtaining, from the mission planning module, the planning information; obtaining context information based on the intended operation of the vehicle, wherein: the context information relates to an operation parameter of the vehicle, and the intended operation relates to an intended value of the operation parameter; determining a context compensated control instruction based on the planning information, the context information, and a context compensation model; obtaining feedback that relates to a deviation of a real-time value of the operation parameter of the vehicle operating according to the context compensated control instruction from an intended value of the operation parameter relating to the intended operation; determining a corrected control instruction based on the feedback and a feedback compensation model; and a vehicle control interface configured to cause the vehicle to operate based on the corrected control instruction.

12. The system of any one or more of the solutions herein, further comprising a perception module configured to acquire environmental information, wherein the mission planning module is configured to generate the planning information based on the environmental information.

13. The system of any one or more of the solutions herein, wherein the environmental information comprises information of an object in a vicinity of the vehicle.

14. The system of any one or more of the solutions herein, wherein: the intended operation comprises a route for the vehicle to traverse, the context information comprises a road geometry of the route, and obtaining the context information based on the intended operation of the vehicle comprises obtaining the road geometry from a map that includes the route.

15. The system of any one or more of the solutions herein, wherein the road geometry of the route comprises at least one of road curvature, road slope, road width, or lane width.

16. The system of any one or more of the solutions herein, wherein the context compensation model includes a Gaussian mixture model.

17. The system of any one or more of the solutions herein, wherein the context compensation model is determined based on driving data collected from prior operations of the vehicle or another vehicle where at least a portion of the context information was present.

18. The system of any one or more of the solutions herein, wherein at least one of the context compensation model and the feedback compensation model is determined offline.

19. The system of any one or more of the solutions herein, wherein the vehicle control module is configured to perform at least a portion of the determination of the context compensated control instruction offline.

20. The system of any one or more of the solutions herein, wherein the vehicle control module comprises a dynamic model predictive control (MPC) controller.

21. An apparatus for controlling a vehicle, comprising: memory storing computer program instructions; and one or more processors configured to execute the computer program instructions to effectuate the method of any one or more solutions herein.

22. The apparatus of any one or more solutions herein, wherein the apparatus is installed onboard the vehicle.

23. One or more non-transitory computer-readable media comprising instructions that, when executed on one or more processors, cause performance of the method of any one or more solutions herein.

24. A system for controlling a vehicle according to the method of any one or more solutions herein.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, e.g., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method for operating a vehicle, comprising:

obtaining planning information relating to an intended operation of the vehicle, the intended operation relating to an intended value of an operation parameter of the vehicle;

obtaining, based on the intended operation of the vehicle, context information relating to an environment in which the vehicle is to operate by following the planning information;

determining a context compensated control instruction based on the planning information and the context information;

obtaining feedback relating to a deviation of a real-time value of the operation parameter of the vehicle operating according to the context compensated control instruction from the intended value of the operation parameter relating to the intended operation;

determining a corrected control instruction based on the feedback; and operating the vehicle based on the corrected control instruction.

2. The method of claim 1, wherein:

the intended operation comprises a route for the vehicle to traverse, the context information comprises a road geometry of the route, and obtaining the context information based on the intended operation of the vehicle comprises obtaining the road geometry from a map that includes the route.

3. The method of claim 1, wherein determining the context compensated control instruction based on the planning information and the context information comprises:

determining, using the context information, context compensation information; and determining the context compensated control instruction based on the planning information and the context compensation information.

4. The method of claim 3, wherein determining the context compensated control instruction based on the planning information and the context compensation information comprises:

determining a preliminary control instruction based on the planning information; and determining the context compensated control instruction based on the preliminary control instruction and the context compensation information.

5. The method of claim 3, wherein at least a portion of the determination of the context compensated control instruction occurs offline.

6. The method of claim 1, wherein obtaining the feedback comprises:

operating the vehicle according to the context compensated control instruction;

receiving sensor data that correspond to the operating of the vehicle according to the context compensated control instruction;

obtaining the real-time value of the operation parameter based on the sensor data; and determining the deviation by comparing the real-time value of the operation parameter with the intended value of the operation parameter.

7. The method of claim 1, wherein determining the corrected control instruction based on the feedback comprises:

determining the corrected control instruction by correcting, based on the feedback, the context compensated control instruction.

8. The method of claim 1, wherein the operation parameter comprises at least one of velocity, position, or acceleration of the vehicle.

9. A system for operating a vehicle, comprising:

a mission planning module configured to provide planning information relating to an intended operation of the vehicle, the intended operation relating to an intended value of an operation parameter of the vehicle;

a vehicle control module configured to perform operations including:

obtaining, from the mission planning module, the planning information;

obtaining, based on the intended operation of the vehicle, context information relating to an environment in which the vehicle is to operate following the planning information;

determining a context compensated control instruction based on the planning information, the context information, and a context compensation model;

obtaining feedback relating to a deviation of a real-time value of the operation parameter of the vehicle operating according to the context compensated control instruction from the intended value of the operation parameter relating to the intended operation;

determining a corrected control instruction based on the feedback and a feedback compensation model; and a vehicle control interface configured to cause the vehicle to operate based on the corrected control instruction.

10. The system of claim 9, further comprising a perception module configured to acquire environmental information, wherein the mission planning module is configured to generate the planning information based on the environmental information.

11. The system of claim 10, wherein the environmental information comprises information of an object in a vicinity of the vehicle.

12. The system of claim 9, wherein:

the intended operation comprises a route for the vehicle to traverse, the context information comprises a road geometry of the route, and obtaining the context information based on the intended operation of the vehicle comprises obtaining the road geometry from a map that includes the route.

13. The system of claim 12, wherein the road geometry of the route comprises at least one of road curvature, road slope, road width, or lane width.

14. The system of claim 9, wherein the context compensation model includes a Gaussian mixture model.

15. The system of claim 9, wherein the context compensation model is determined based on driving data collected from prior operations of the vehicle or another vehicle where at least a portion of the context information was present.

16. The system of claim 9, wherein at least one of the context compensation model and the feedback compensation model is determined offline.

17. The system of claim 9, wherein the vehicle control module is configured to perform at least a portion of the determination of the context compensated control instruction offline.

18. The system of claim 9, wherein the vehicle control module comprises a dynamic model predictive control (MPC) controller.

19. A non-transitory computer readable medium having instructions stored thereupon, the instructions, upon execution by at least one processor, causing the at least one processor to implement a method comprising:

obtaining planning information relating to an intended operation of a vehicle, the intended operation relating to an intended value of an operation parameter of the vehicle;

obtaining, based on the intended operation of the vehicle, context information relating to an environment in which the vehicle is to operate by following the planning information;

determining a context compensated control instruction based on the planning information and the context information;

obtaining feedback relating to a deviation of a real-time value of the operation parameter of the vehicle operating according to the context compensated control instruction from the intended value of the operation parameter relating to the intended operation;

determining a corrected control instruction based on the feedback; and operating the vehicle based on the corrected control instruction.

20. The non-transitory computer readable medium of claim 19, wherein:

the intended operation comprises a route for the vehicle to traverse, the context information comprises a road geometry of the route, and obtaining the context information based on the intended operation of the vehicle comprises obtaining the road geometry from a map that includes the route.

* * * * *